United States Patent
May (10) Patent No.: US 7,075,280 B2
(45) Date of Patent: Jul. 11, 2006

(54) PULSE-SKIPPING PFM DC-DC CONVERTER USING A VOLTAGE MODE CONTROL LOOP

(75) Inventor: Marcus W. May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 0 days.

(21) Appl. No.: 10/675,114

(22) Filed: Sep. 30, 2003

(65) Prior Publication Data

US 2005/0001603 A1    Jan. 6, 2005

Related U.S. Application Data

(60) Provisional application No. 60/484,557, filed on Jul. 2, 2003.

(51) Int. Cl.
*G05F 1/40* (2006.01)

(52) U.S. Cl. ........................ 323/284; 323/224

(58) Field of Classification Search ........ 323/222–225, 323/271, 282, 284, 351

See application file for complete search history.

(56) References Cited

U.S. PATENT DOCUMENTS

| | | | | |
|---|---|---|---|---|
| 5,552,694 A | * | 9/1996 | Appeltans | 323/222 |
| 6,188,209 B1 | * | 2/2001 | Poon et al. | 323/255 |
| 6,204,651 B1 | | 3/2001 | Marcus et al. | |
| RE37,609 E | * | 3/2002 | Bittner | 323/272 |
| 6,373,954 B1 | * | 4/2002 | Malcolm et al. | 381/119 |
| 6,396,251 B1 | * | 5/2002 | Corva et al. | 323/283 |
| 6,965,221 B1 | * | 11/2005 | Lipcsei et al. | 323/283 |

\* cited by examiner

*Primary Examiner*—Gary L Laxton
(74) *Attorney, Agent, or Firm*—Garlick Harrison & Markison LLP; Bruce E. Stuckman (57) ABSTRACT

A pulse frequency modulation unit controls upper limit level and lower limit level for an output voltage of a DC-DC converter. A voltage mode control loop uses the upper and lower limit levels in a feedback loop to generate a control signal to enable and disable the converter circuit.

13 Claims, 5 Drawing Sheets

PULSE-SKIPPING PFM DC-DC CONVERTER USING A VOLTAGE MODE CONTROL LOOP

CROSS REFERENCE TO RELATED APPLICATION

This application claims the benefit of U.S. Provisional Patent Application Ser. No. 60/484,557; filed Jul. 2, 2003; and titled "Pulse-Skipping PFM DC-DC Converter Using A Voltage Mode Control Loop."

BACKGROUND OF THE INVENTION

1. Technical Field of the Invention

The embodiments of the invention relate to converter circuits and, more particularly, to utilizing a PFM circuit to control a DC-DC converter of an integrated circuit chip.

2. Description of Related Art

A variety of electronic equipment, especially portable or handheld electronic devices, are capable of being powered from a battery. Some of these portable and/or handheld devices include, but are not limited to, laptop or notebook computers, personal digital assistants (PDAs), compact disc (CD) players, digital video disc (DVD) players, MP3 (an audio standard under the Moving Picture Experts Group or MPEG) players, AM/FM (amplitude modulation/frequency modulation) radios, pagers, cellular telephones, etc. These devices typically contain one or more integrated circuit chips to perform the function(s) intended by the device. Many, if not most, of these devices may be powered by self-contained power sources (such as a battery), and many are powered by external power sources (wall outlet), or both.

In today's applications, certain interfaces may provide a power source through the interface itself. A bus specification, such as a Universal Serial Bus Revision 2.0 specification (USB 2.0) provides not only protocol for data transfer between two devices, but the USB 2.0 specification also provides a power link between a USB host and a USB device coupled onto the bus. For example, a peripheral device (such as a MP3 player), when coupled to a host (such as a personal or laptop computer) through USB 2.0, the bus not only provides the data lines for data transfer between the two devices, but +5 volts (nominal) is also provided to the peripheral through the interconnect. Thus, devices coupled onto the USB 2.0 interconnect may utilize the voltage provided on the bus to power circuitry of the peripheral component.

A DC-DC (direct current-to-direct current) converter may be utilized to convert the battery voltage, external voltage or both voltages to a DC value which will supply power to various circuits of an integrated circuit chip or chips. The converted voltage may be a supply voltage (rail voltage) provided to a load. Since the load at the output of the DC-DC converter may vary substantially, the load current may vary considerably as well. For example, with a MP3 player, the load may vary considerably due to the various power states that the MP3 player may be in. When the MP3 player is not being utilized, the MP3 player may have an ultra-low power state, but may awaken as soon as a button is pushed. In some instances it is desirable for the DC-DC converter to be as efficient as possible in the low power state to extend the device's battery life.

However, when switched DC-DC converters are used, the converters are inherently less efficient when driving light loads because the power needed to switch the large power field-effect-transistors (FETs) is comparable or greater than the energy transferred to the load. When driving a heavy load, the energy needed to switch the FETs is less relative to energy transferred to the load, so the efficiency is higher. A common way to improve light load efficiency is to implement a pulse-frequency modulation (PFM) converter, which modulates the frequency that the DC-DC converter operates to optimize efficiency by enabling the power FETs to bring the output voltage to a high threshold, then disabling the FETs until the voltage drops to a low threshold. This improves efficiency by reducing the number of time the FETs are toggled to transfer power to the load.

The architecture of these PFM converters typically implement some form of current mode control. However, current mode control is difficult, because it requires sensing currents, which is difficult to sense due to noise, offsets and circuit complexity. Also, sensing a current usually requires a sensing resistor, which negatively impacts efficiency. Thus, sensing current in a switched DC-DC converter may be difficult to do or may be undesirable.

SUMMARY OF THE INVENTION

In one embodiment of the invention, a voltage converter uses a pulse frequency modulation unit to receive a feedback of an converted output voltage and establishes an upper limit level and lower limit level for the output voltage by use of a voltage mode control loop to maintain the output voltage near the converted value determined by the upper and lower limit levels. The pulse frequency modulation unit further includes a filter to filter the feedback of the output voltage to detect a sign change when the upper and lower limits are crossed and, in one instance, to detect the steady state condition in the control loop. A pulse frequency modulation unit skips predetermined number of pulses of the filter output after a sign change to turn off the voltage converter.

In another embodiment of the invention, a direct current to direct current (DC-DC) converter employs a converter circuit to convert a battery voltage to an output voltage, in which the converter circuit includes a pair of switching transistors that switch alternately to have the battery voltage converted to produce the output voltage. A control circuit is used to receive a feedback of the output voltage to maintain the output voltage within a specified value between an upper limit level and a lower limit level. The control circuit is used to disable the converter circuit when the output voltage is at the upper limit level and to enable the converter circuit when the output voltage is at the lower limit level to maintain the output voltage between the upper and lower limit levels.

In another embodiment, a comparator in the feedback loop of the output voltage compares the output voltage to a reference value to detect a sign change at a crossover point when the upper and lower limit levels are reached by the output voltage. In another embodiment, the converter includes a high rate filter and a low rate filter to filter the output from the comparator to control switching operation of a pair of switching transistors of the converter, but only the high rate filter is used to generate a control signal to enable and disable the pair of transistors.

DETAILED DESCRIPTION OF THE EMBODIMENTS OF THE INVENTION

The embodiments of the present invention may be practiced in a variety of settings that implement a power converter, such as a direct current-direct current (DC-DC) converter. For example, in one embodiment of the invention, a DC-DC converter receives battery power and converts the battery voltage to an output voltage, which is utilized by other component(s) powered by the DC-DC converter. Whenever external power (such as power provided by USB 2.0 interconnection), the DC-DC converter may convert this voltage as well. With that understanding, the examples below are described in reference to converting battery voltage to a DC voltage, which powers a load. Furthermore, although a variety of different systems and components may be implemented, a particular system implementation is illustrated in FIG. 1 as one embodiment of a system to practice the invention.

Figure 1:
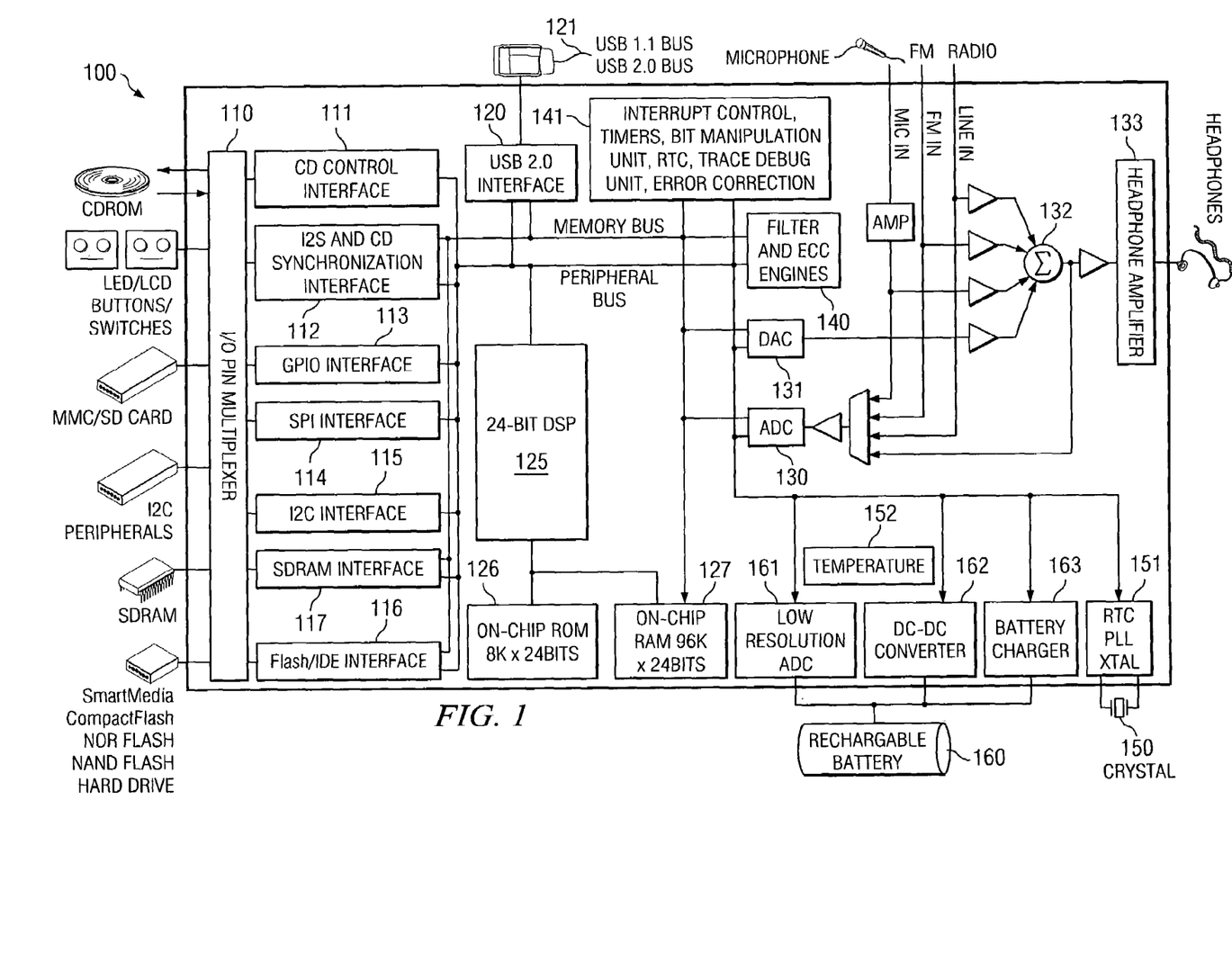
FIG. 1 is a block schematic diagram of an integrated circuit chip operating as an audio system on a chip.

Referring to FIG. 1, an example integrated circuit (IC) 100 is shown in which one embodiment of the invention is implemented within IC 100. The example IC 100 is a single IC chip that implements a complete audio system. It is to be noted that the example embodiment of FIG. 1 implements a complete audio system on a single chip, but other embodiments of the invention may incorporate one or more integrated circuit chips to provide a complete system or parts of a system.

As illustrated in FIG. 1, a variety of blocks are noted within the confines of IC 100. The various blocks exemplify hardware components, software and interfaces resident within IC 100. The example audio system of IC 100 may operate with one or a variety of devices, as illustrated in FIG. 1. Accordingly, a CD (compact disc); LED (Light Emitting Diode)/LCD (Liquid Crystal Display) displays, buttons and/or switches; MMC (Multimedia Card)/SD (Secure Digital) cards; I2C peripherals; SmartMedia, Compact Flash, NOR Flash, NAND Flash, and/or hard drive devices; and memory, such as SDRAM (Synchronous Dynamic Random Access Memory) are some components that may be coupled to IC 100 through an I/O (input/output) pin multiplexer 110, as is illustrated in FIG. 1. These various multiplexed connections are coupled to respective interfaces, as shown in FIG. 1. These interfaces include CD control interface 111; I2S and CD synchronization interface 112; GPIO (General Purpose Input/Output) interface 113, SPI (Serial Peripheral Interface) interface 114; I2C interface 115; Flash/IDE (Integrated Device Electronics) interface 116; and SDRAM interface 117.

Furthermore, a USB 2.0 interface 120 allows the coupling of a USB connection external to IC 100. In the particular embodiment shown, USB 2.0 interface 120 is compatible with the USB 2.0 and backward compatible to a USB 1.1 protocol. A microphone input, radio input and a line input are also available on IC 100 to allow interconnection to a microphone, radio, or other audio input.

The core of IC 100 is a DSP (Digital Signal Processor) 125, which in this embodiment is a 24-bit DSP. An on-chip ROM (Read Only Memory) 126 and an on-chip RAM (Random Access Memory) 127 operate as memory for DSP 125. An analog-to-digital converter (ADC) 130 allows for analog inputs to be converted to digital format for processing by DSP 125. Similarly, a digital-to-analog converter (DAC) 131 is present to convert digital signals to analog signals for output in analog form. In this instance, amplified signals through a summation node 132 and headphone amplifier 133 generate an amplified analog signal output external to IC 100. For example, the analog output may be operably coupled to a set of headphones. Also included within IC 100 is a filter and ECC (Error Correction Circuit) engines 140 to provide filtering and error correction operations. Other functions are shown within block 141 to provide various control and timing functions. These may include Interrupt Control, Timers, Bit Manipulation Unit, Real Time Clock (RTC), Trace Debug Unit, and error correction just to name a few of the operations.

Also within IC 100 is a RTC PLL (Real Time Clock/Phase Lock Loop) circuit 151, which is coupled to an external crystal 150 to provide an accurate clocking signal for circuits of IC 100. Memory and peripheral buses are also present within IC 100 for transfer of data and signals. A temperature sensor circuit 152 is present to monitor the temperature of IC 100.

In FIG. 1, a rechargeable battery 160 is shown coupled to a low resolution ADC 161, DC-DC converter 162 and battery charger 163. ADC 161 monitors the battery voltage to determine if the battery voltage is such that battery 160 may require charging or if the battery is fully charged. The ADC 161 may also monitor the battery voltage to determine if a battery is present. Thus, if the battery is not present or is removed during use, IC 100 detects the absence of the battery through the monitoring provided by the ADC 161. The DC-DC converter 162 converts the battery voltage to an operative voltage utilized by components of IC 100. Battery charger 163 is utilized to charge the battery when an external voltage source is coupled to IC 100.

A variety of batteries may be utilized for battery 160 and, as noted above, battery 160 is a rechargeable battery. In one particular embodiment, the rechargeable battery is a Nickel Metal Hydride (NiMH) battery. It is to be noted that various other batteries may be utilized, including alkaline cells and lithium ion (LiON) batteries. Generally, battery 160 provides a voltage in the range of 0.9 to 3.6 volts to IC 100. In the instance where a NiMH battery is used, the typical range is 0.9 to 1.25 volts. Since the voltage from the battery may vary, and/or the circuitry may require voltages other than what is provided by the battery, DC-DC converter 162 provides conversion of the battery voltage to one or more voltages utilized on IC 100. In some embodiments, the converter 162 may provide more than one DC conversion from the battery. For example, in one embodiment a NiMH battery of 0.9 to 1.25 volts may provide nominal chip voltage of 3.3 volts to the load. In another a combination of 3.3 volts and 1.8 volts are provided to the load.

The IC 100 is designed to also operate from other external power sources, when such power sources are coupled to IC 100. One of the power sources may be provided through USB 2.0 interface 120. The USB 2.0 protocol specifies the transfer of data by the use of differential data lines through a USB link, such as bus 121. The data is generally provided on a differential lines (D+ and D− lines). The USB 2.0 protocol also specifies the presence of a +5 volt DC voltage through bus 121 through $V_{BUS}$ and ground (GND) connections. Thus, an external power source having a voltage of +5 volts (nominal) may be used as a power source for the IC 100 through USB 2.0 interface 120 when bus 121 is coupled to the IC 100. In this instance, a USB host provides the 5 volts, while IC 100 operates as a USB device coupled to the USB host. IC 100 then may use the 5 volts to power components or circuitry on IC 100 provided the various USB specification requirements are met. In the particular embodiment of FIG. 1, when bus 121 is coupled to IC 100, the 5 volts from the USB host powers the internal circuitry, instead of battery 160. Charger 163 uses the 5 volts from the USB host to also charge battery 160.

Figure 2:
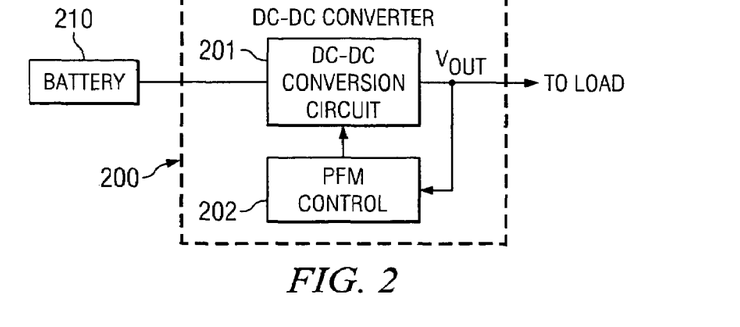
FIG. 2 is a block schematic diagram illustrating an embodiment of the invention in which PFM control is used within a DC-DC converter to control the activation/deactivation of the DC-DC converter circuit.

Referring to FIG. 2, a DC-DC converter 200 is shown operably coupled to a battery 210. The DC-DC converter 200 comprises a DC-DC conversion circuit 201 and a pulse frequency modulation (PFM) control unit 202. The DC-DC conversion circuit 201 is coupled to the battery and performs the conversion on the voltage supplied by battery 210 to generate an output voltage $V_{OUT}$. Voltage $V_{OUT}$ then supplies power to a load. It is to be noted that a variety of DC-DC converter circuits may be implemented and that DC-DC conversion circuit 201 in FIG. 2 is but one embodiment for achieving the voltage conversion. In typical operation, the battery voltage is converted or boosted to a higher voltage $V_{OUT}$. For example, in one embodiment the battery supplies a voltage approximately in the range of 0.9–1.1 volt, and DC-DC conversion circuit 201 converts that battery voltage to an approximate $V_{OUT}$ voltage of 3.3 volts.

Figure 5:
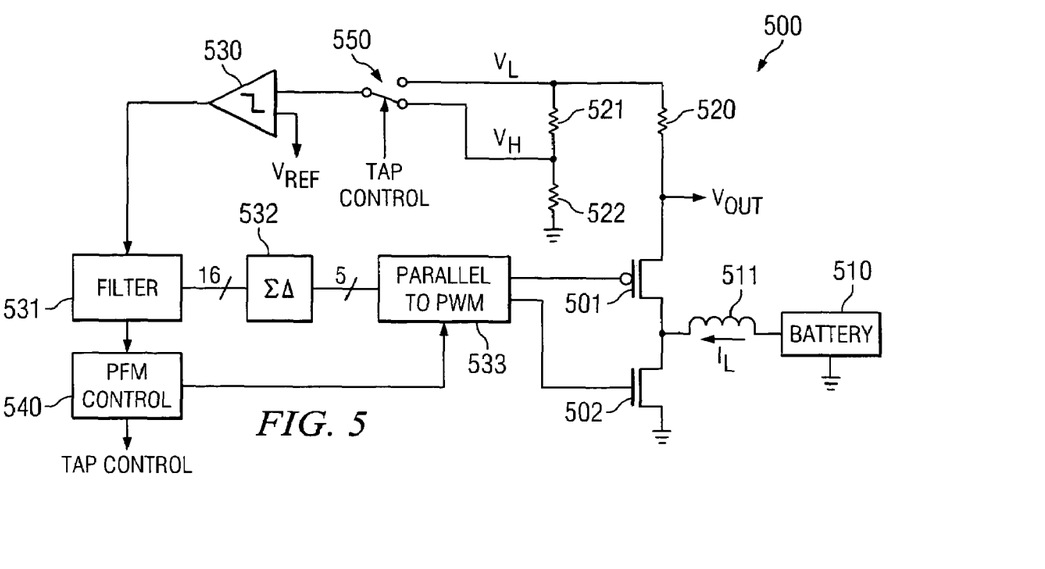
FIG. 5 is a circuit schematic diagram for implementing the DC-DC converter of FIG. 2 and utilizing the PFM control unit of FIG. 4.

Although a variety of DC-DC conversion circuits may be employed, one type of popular conversion circuitry uses a switch mode converter having switching transistors, such as Field Effect Transistors (FETs). One such switch mode converter circuit is illustrated in the embodiment of FIG. 5 and described further below. Another embodiment for employing a switch mode converter is described in U.S. Pat. No. 6,204,651. Thus, it is to be noted that a variety of converters may be used for the DC-DC conversion circuit 201 of FIG. 2, but a number of embodiments employ switching transistors to provide switch mode conversion of the battery voltage for use by the load.

The PFM control unit 202 is also shown as part of the DC-DC converter 200. The PFM control unit 202 receives the $V_{OUT}$ voltage and generates control signals to the DC-DC conversion circuit 201 to determine the upper and lower switching thresholds or limits for the transistors of DC-DC conversion circuit 201. As stated, one embodiment for implementing DC-DC converter 200 of FIG. 2 is shown in more detail in FIG. 5. Furthermore, DC-DC converter 200 may be implemented for the DC-DC converter shown for IC 100 in FIG. 1.

As noted in the Background section above, pulse frequency modulation control may be used in a switched DC-DC converter to improve light load efficiency. PFM control unit 202 utilizes pulse frequency modulation to improve light load efficiency of the converter by modulating converter frequency, but does so using voltage mode control loop for the converter.

Figure 3:
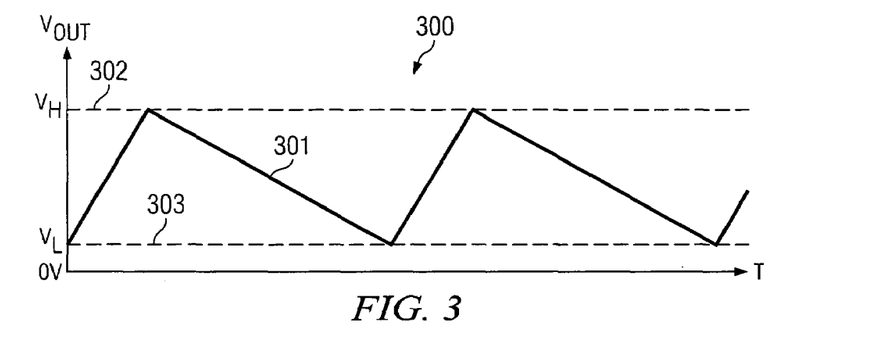
FIG. 3 illustrates a waveform diagram in which upper and lower limit levels are used to provide voltage mode control loop to control output voltage $V_{OUT}$.

The operation of the PFM control unit 202 for voltage mode control loop operation is better understood with the $V_{OUT}$ diagram shown in FIG. 3. Diagram 300 is a graph of the voltage $V_{OUT}$ versus time. Voltage waveform 301 shows the voltage waveform of $V_{OUT}$ at the output of the DC-DC converter 200 of FIG. 2. An upper (or high) threshold (also referred to as limit or target) level is noted as $V_H$ and this limit level is shown by dotted line 302 in FIG. 3. A lower (or low) threshold (limit or target) level is shown as $V_L$ and by dotted line 303. The PFM control unit 202 maintains the $V_{OUT}$ voltage from the DC-DC converter between the two limit levels. Thus, when the $V_{OUT}$ value reaches the upper limit level $V_H$, the DC-DC converter circuit is deactivated, which allows the output voltage to drop.

Once $V_{OUT}$ drops to the lower limit level $V_L$, then the PFM control unit 202 activates the DC-DC converter, so that $V_{OUT}$ begins to climb until it reaches the upper limit level $V_H$. The cycling between the two selected limit levels, attempt to confine $V_{OUT}$ between $V_H$ and $V_L$ levels. In one technique, the PFM control unit 202 causes the pulse width modulator, which controls the operation of switching transistors of the DC-DC converter, to disable the switching transistors (skipping pulses) when the $V_H$ limit is reached.

Figure 4:
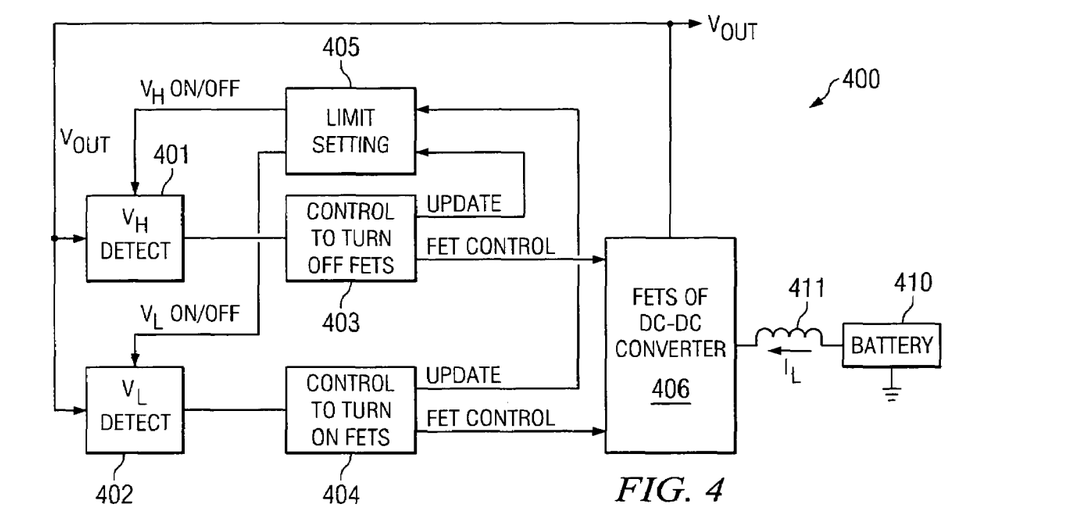
FIG. 4 is a block schematic diagram illustrating one embodiment for implementing the PFM control unit shown in FIG. 2 employing the voltage mode control loop of FIG. 2.

FIG. 4 illustrates a block diagram of a circuit 400 depicting one embodiment for implementing the PFM control unit 202 of FIG. 2. Circuit 400 comprises a $V_H$ detect unit 401, a $V_L$ detect unit 402, a control unit 403 to turn off the FETs, a control unit 404 to turn on the FETs, a limit setting unit 405 and FETs 406, which operate to provide a switch mode DC-DC conversion. A battery 410 is shown operably coupled to the FETs 406 through an inductor 411. In this particular embodiment, the FETs control the switching of the inductive current $I_L$ to the output to generate the conversion of the battery voltage to $V_{OUT}$. The use of an inductive current from the battery 410 in a switch mode converter to generate an output voltage is generally known and one such technique is described in U.S. Pat. No. 6,204,651. Furthermore, in one embodiment described below, the $V_H$ detect unit 401 senses a steady state condition of the control loop of the circuit 400.

In operation, the $V_{OUT}$ voltage is monitored by the upper limit level and the lower limit level detect units 401 and 402, respectively, to turn on (activate or enable) or off (deactivate or disable) FETs 406 as illustrated by waveform 301 of FIG. 3. Accordingly, when the upper limit level $V_H$ is reached, $V_H$ detect unit 401 sends a signal to control unit 403 to turn off FETs 406. Control unit 403 also sends an update signal to the limit setting unit 405 to deactivate $V_H$ detect unit 401 and activate $V_L$ detect unit 402. Once the FETs 406 are turned off by control unit 403, $V_{OUT}$ begins to drop until the lower limit level $V_L$ is reached. When $V_{OUT}$ reaches the $V_L$ limit level, $V_L$ detect unit 402 detects the lower limit voltage and sends a signal to control unit 404 to turn the FETs 406 back on.

Additionally, control unit 404 sends an update signal to the limit setting unit 405, which then turns off $V_L$ detect unit 402 and turns on $V_H$ detect unit 401. The FETs 406 are now activated so that the output voltage $V_{OUT}$ continues to rise until the upper limit level of $V_H$ is reached, at which point the cycle repeats itself. It is to be noted that various other circuitry may be implemented in other embodiments to detect lower and/or upper limit levels and activate or deactivate the FETs of DC-DC converter 406.

Circuit 500 of FIG. 5 depicts one embodiment for implementing circuit 400 of FIG. 4. The FETs 406 are shown as a P-channel transistor 501 and N-channel transistor 502. A battery 510 and an inductor 511 are coupled to the junction node of the transistors 501 and 502. A feedback loop comprised of voltage divider resistors 520, 521, and 522, a comparator 530, a filter 531, a sigma delta (ΣΔ) unit 532 and a parallel to pulse width modulation (PWM) unit 533, provide the control loop to control the switching of transistors 501, 502. A PFM control unit 540 receives an input signal from filter 531 and generates a control signal to control the input to unit 533, as well as tap control to the voltage divider network at the input of comparator 530.

In operation, when N-channel transistor 502 is activated, energy is stored in 25 inductor 500 with the flow of the inductor current $I_L$. P-channel transistor 501 is off during this phase. Subsequently, transistor 502 is turned off and transistor 501 is turned on to transfer the stored energy of the inductor to the output node for $V_{OUT}$. Accordingly, the switch mode switching operation of the transistors transfers the inductor current supplied by the battery 510 to the output node corresponding to $V_{OUT}$. This current transfer allows battery voltage conversion so that a $V_{OUT}$ of converted magnitude is provided. Because of the rapid switching of the transistors 501 and 502 to generate $V_{OUT}$ from the source voltage of the battery, the inductor current $I_L$ is constantly changing, therefore difficult to measure accurately. Thus, the described embodiment of the present invention monitors $V_{OUT}$ to set upper and lower limits $V_H$ and $V_L$ by controlling when the transistor pairs 501 and 502 are to be operative in the switch mode to provide DC-DC conversion.

Filter 531 filters the comparator output and generates a 16-bit signal to a digital sigma delta (ΣΔ) unit 532. The ΣΔ unit 532 then generates a 5-bit control signal to parallel to PWM control unit 533. The 5 bits determine the turn-on/turn-off phases for transistors 501 and 502 when the transistors operate in the switch mode to convert the battery voltage. Filter 531, ΣΔ unit 532 and parallel to PWM unit 533 are utilized to control the timing of the pulse duration of transistors 501, 502 to obtain the proper desired voltage conversion of the battery voltage, when in the switch mode of operation. PFM control unit 540 is the unit which is utilized to control the upper and lower limit levels to activate and deactivate the switching operation of the transistors 501, 502. PFM control unit 540 sends a control signal output to parallel to PWM unit 533. In one technique, the pulses to the PWM unit 533 are skipped (pulse-skipping PWM) when the control loop is transitioning from $V_H$ to $V_L$.

The voltage divider network provided by resistors 520, 521, 522 is coupled as input to one input of comparator 530. A reference voltage, noted as $V_{REF}$, is used to set a threshold to detect a sign change for the input of comparator 530 as part of the feedback for controlling the activation of transistors 501, 502. It is to be noted that two separate comparator units with two different $V_{REF}$ values may be utilized to separately monitor and identify when the $V_H$ and $V_L$ limit levels are reached. However, in the particular embodiment shown in FIG. 5, a tap control signal from PFM control unit 540 is coupled to a switch 550 to determine which tap is to be selected. The tap selection by switch 550 corresponds to the limit setting unit 405 of FIG. 4.

The position of switch 550 determines the tap point for the voltage divider network of resistors 520–522. Thus, when $V_{OUT}$ reaches the pre-selected $V_H$ limit level, a sign change at the output of the comparator 530 is detected by filter 531. The PFM control unit 540 in turn sends a control signal to the parallel to PWM unit 533 to turn off both transistors 501 and 502. Furthermore, the tap control unit then switches to the other tap where the lower limit level $V_L$ is now monitored. As $V_{OUT}$ continues to drop, the $V_L$ limit level is monitored. Once the $V_{OUT}$ voltage reaches the lower limit level of $V_L$, the filter detects the sign change and then sends a signal to PFM control unit 540. PFM control unit 540 then sends a signal to the parallel to PWM unit 533 to activate the transistors so that switch mode operation to convert the battery voltage may commence again. The tap control signal switches the tap back to the $V_H$ position so that the upper limit level or $V_H$ may be monitored.

It is appreciated that although a simple switch 550 is shown in the circuit 500, it is to be noted that various other switching mechanism may be employed, including multiplexers, transistors, as well as other hardware and software control. A simple switch (switch 550) is shown for simplicity of explaining the operation of the tap selection.

In one embodiment for practicing the invention, the $V_H$ detect unit 401 may look at a steady state condition at the upper limit. In some applications, oscillations may be present as a natural response of a second order system as it approaches steady state. Thus, oscillations are typically present in response to a step function input. In those situations where oscillations are present, the $V_H$ detect unit 401 waits until a steady state condition is reached before turning off the FETs.

Figure 6:
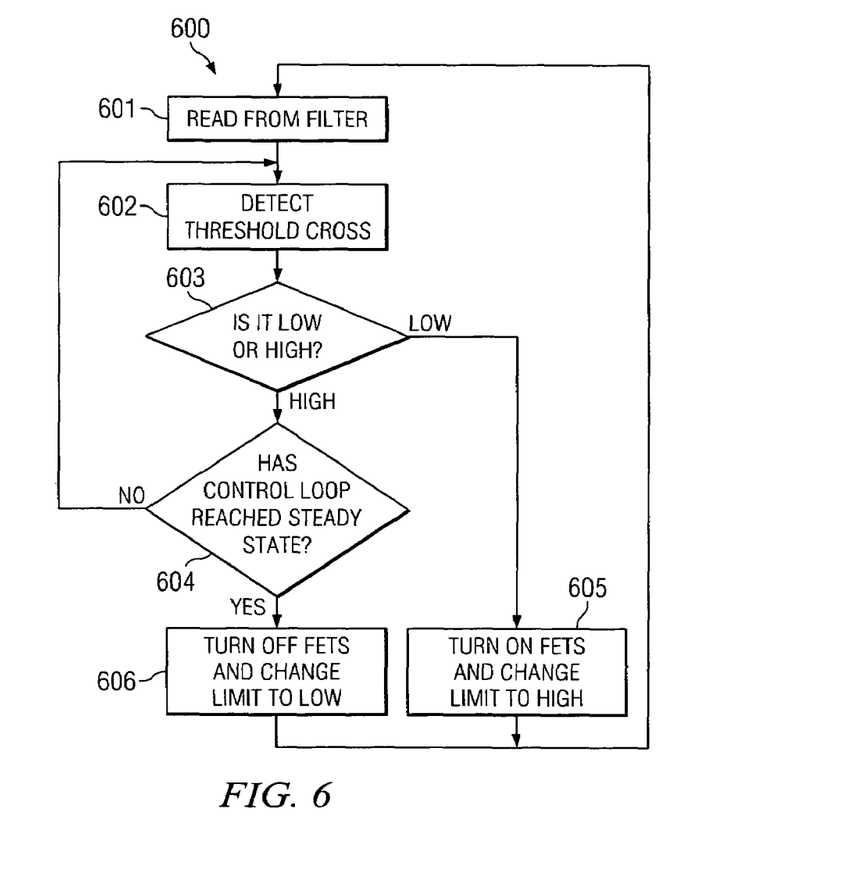
FIG. 6 is a flow diagram illustrating the operation of a software program to generate the PFM control signals to turn the FETs on and off, as well as changing a limit level for subsequent detection.

It is to be noted that PFM control unit 540 may provide the control operation by software. Accordingly, FIG. 6 illustrates a flow diagram 600 in which the PFM control unit reads the $V_{OUT}$ value from the filter (block 601). When the threshold crossing is detected (block 602), a determination is made if the crossing is the upper or lower limit level (block 603). If the upper limit is detected, then a determination is made to ascertain if a steady state condition has been reached (block 604). If not, then the threshold crossing detection is looped until a steady state is reached for the upper limit detection. Once the steady state detection is reached at the upper limit, the FETs are disabled and the limit level changed to detect the lower limit level for the tap (block 606). If the limit level detected is the low limit level (at block 603), the FETs are turned on and the limit level is changed now to detect the upper limit level (block 605). It is to be noted that looping of block 604 is to simply allow the control loop to reach a steady state condition at the $V_H$ limit level, before disabling the FETs. In some embodiments, where the steady state is reached quickly, block 604 may be skipped. An example oscillation that may be experienced when reaching the $V_H$ limit level is shown in FIG. 7.

Figure 7:
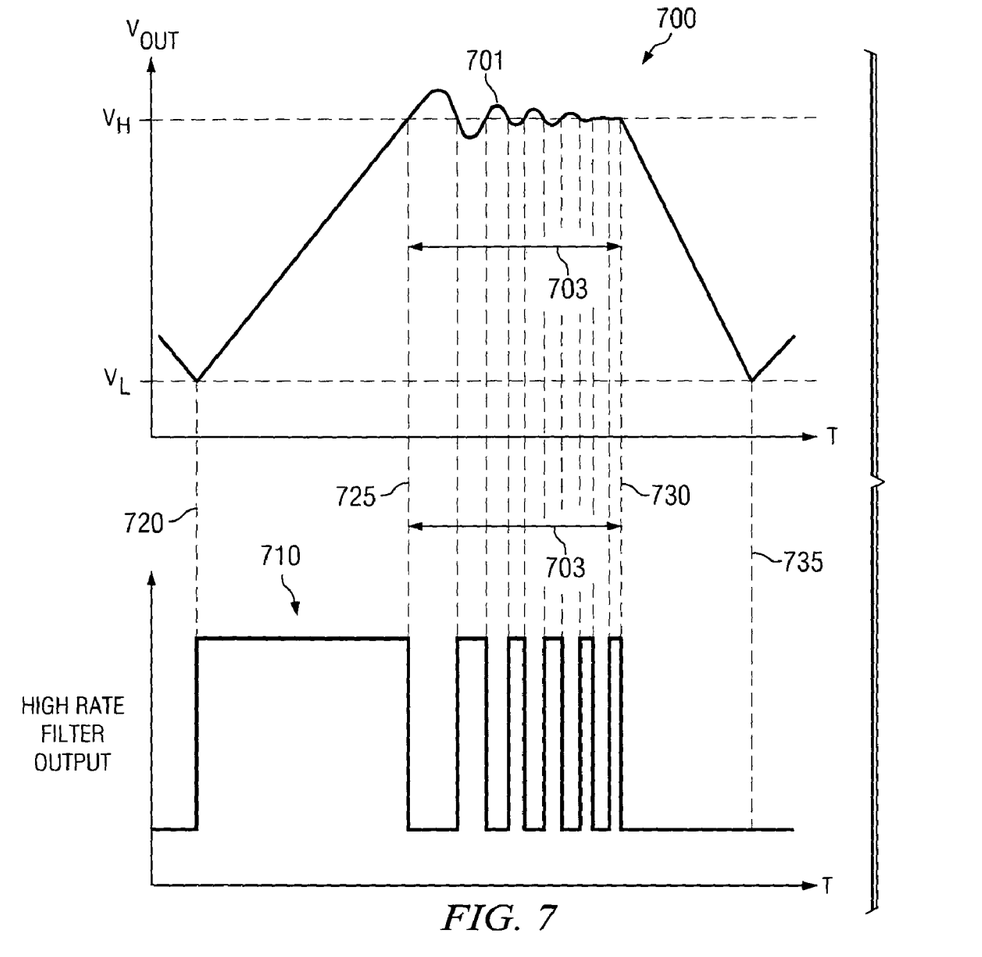
FIG. 7 is a waveform diagram illustrating one response of a filter output when upper limit level $V_H$ detection is reached and a subsequent wait time to reach a steady state condition before turning off the FETs.

FIG. 7 illustrates one embodiment for detecting the threshold at the upper limit level $V_H$. Although waveform 301 of FIG. 3 illustrated a sharp switching of the output voltage $V_{OUT}$ when $V_{OUT}$ reached the limit levels 302, 303, in reality there may be some finite time before a steady state condition is reached at the $V_H$ limit level. Waveform 700 illustrates this concept in FIG. 7.

In FIG. 7, waveform 700 shows a condition where oscillations 701 are present when the $V_H$ limit is reached. The bottom portion of FIG. 7 illustrates an output of a filter (such as a high rate filter described in reference to FIG. 8), where a state change is noted, whenever a sign change is noted from the filter output. A sign change is noted whenever one or the other of the limit levels is crossed. Waveform 710 illustrates the response output from the filter.

Accordingly, at time 720 when $V_{OUT}$ reaches $V_L$, a state change is noted by the filter output corresponding to the crossing detection at $V_L$. Subsequently, at time 725, $V_{OUT}$ reaches the $V_H$ limit, causing a state change at the output of the filter. As noted, some amount of time may lapse before a steady state condition is reached. Using oscillations as an example, the state change of waveform 710 illustrate that multiple crossings may be detected, before a steady state condition is reached at time 730.

In order to prevent the non-steady state condition (crossings due to oscillations) to affect the circuit response, the $V_H$ detect unit waits until a steady state condition is reached at time 730, before turning off the FETs. A variety of techniques may be employed to ensure that the steady state condition at time 730 is reached, before turning off the FETs. One such technique is to ignore a predetermined number of data counts (corresponding to time 703) by skipping a number of pulses from the filter once the initial sign change at the $V_H$ limit occurs at time 725. This ensures that the steady state condition may be substantially reached at time 730 prior to having the FETs turned off. As noted in FIG. 7, the FETs are turned off at time 730 and $V_{OUT}$ declines until the $V_L$ limit is reached, causing another state change in waveform 710 at time 735.

Figure 8:
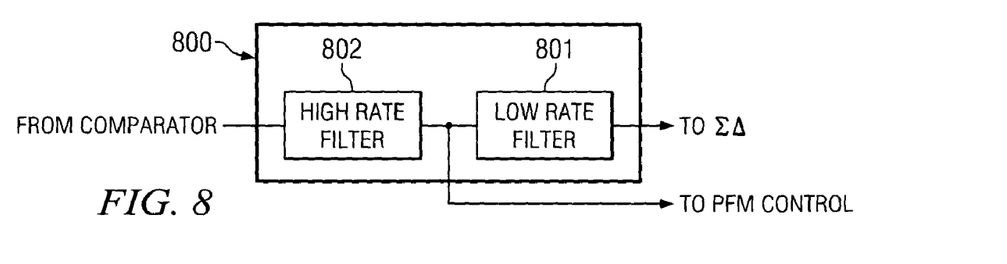
FIG. 8 is a block schematic diagram illustrating a utilization of a high rate filter and a low rate filter in the filter unit as one embodiment in implementing a filter shown in FIG. 5.

In normal operation of controlling the transistors 501, 502 for DC-DC conversion, a filter unit 800 of FIG. 8 may be employed. Filter 531 of FIG. 5 may employ filter unit 800. Filter unit 800 comprises a high rate filter 802 and a low rate filter 801. High rate and low rate filters 802, 801 are utilized to send the filtered signal to the $\Sigma\Delta$ unit to be quantized. The output of high rate filter 802 is also sent to the PFM control unit (such as unit 540 of FIG. 5). This allows for a quick response to the feedback signal, when the $V_{OUT}$ level reaches the limit levels. A variety of filters may be employed for the filter units 801 and such filters may or may not employ the high rate filter 802. In other embodiments, a filter may not be present.

Figure 9:
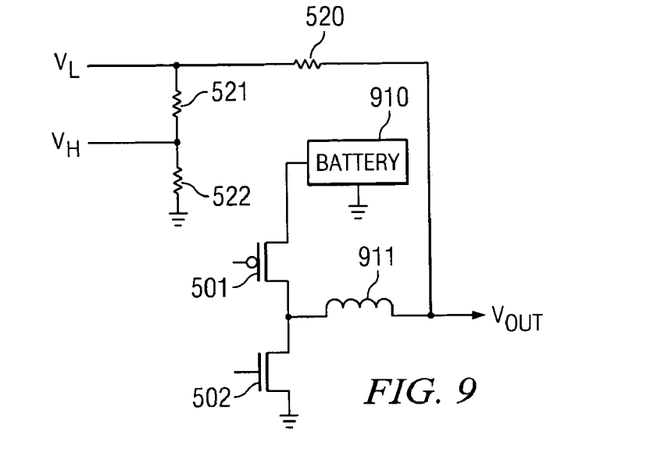
FIG. 9 is a circuit schematic diagram showing a modified circuit of FIG. 5 to design a buck converter.

It is to be noted that various other circuitry may employ embodiments of the invention. Thus, instead of the DC-DC converter of FIG. 5, a "buck converter" of FIG. 9 may employ a similar technique. In FIG. 9, a battery 910 and inductor 911 are reversed in their placement from like items shown in FIG. 5. The buck arrangement is employed to generate $V_{OUT}$ that is less in magnitude from the battery voltage. The $V_H$ and $V_L$ signals are employed as in FIG. 5 to control the FETs 501, 501.

Figure 10:
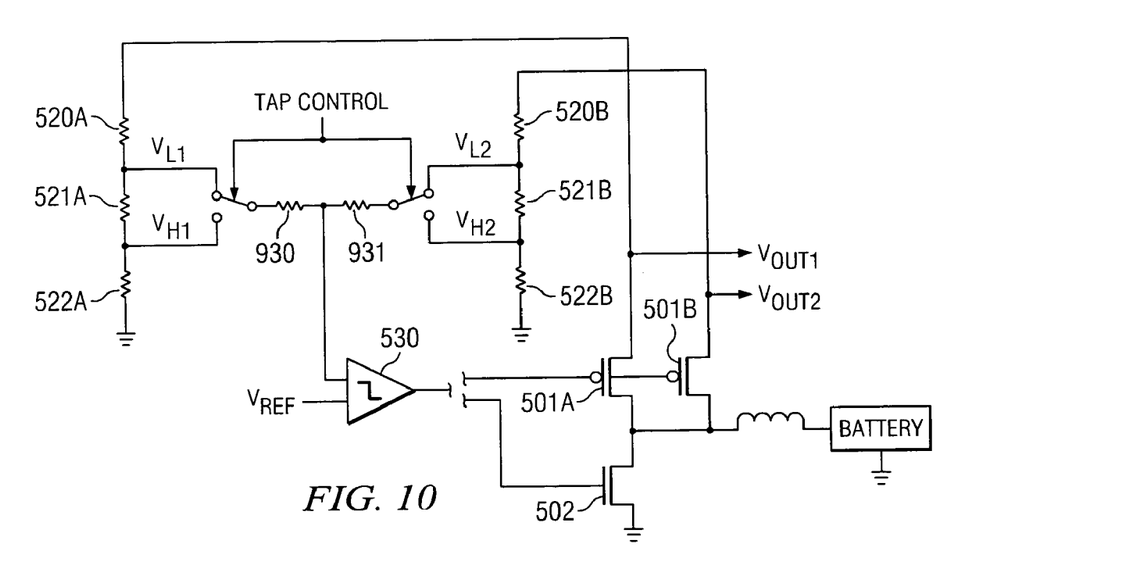
FIG. 10 is a circuit schematic diagram showing another modified circuit of FIG. 5 to design a multiple-output boost converter.

Another embodiment is shown in FIG. 10. In FIG. 10, a multiple output boost circuit is illustrated in which multiple $V_{OUTS}$ (shown as $V_{OUT1}$ and $V_{OUT2}$) are generated at output of transistors 501A and 501B. The separate $V_{OUTS}$ have their own separate voltage divider network to generate separate $V_L$ and $V_H$ outputs ($V_{L1}$, $V_{H1}$, $V_{L2}$ and $V_{H2}$). Since there are multiple $V_L$ and $V_H$ outputs, the corresponding multiple outputs VL and VH are respectively combined through resistor network of resistors 930, 931 for input into comparator 530. The remaining circuitry may be equivalent to that of FIG. 5. It is to be noted that although only two $V_{OUT}$ outputs are noted, more than two $V_{OUTS}$ may be used.

Thus, by employing pulse frequency modulation control using a voltage mode control loop to activate and deactivate transistors used in switched DC-DC converters, a more precise operational control may be achieved. An advantage of such voltage mode control loop may be used in a switched DC-DC converter to improve light load efficiency.

I claim:
1. An apparatus comprising:
 a voltage converter to convert a voltage of a first value to an output voltage of a second value; and
 a pulse frequency modulation unit to receive a feedback of the output voltage and to establish an upper limit level and lower limit level for the output voltage by use of a voltage mode control loop to maintain the output voltage from the converter near the second value determined by the upper and lower limit levels;
 the pulse frequency modulation unit further including a filter to filter the feedback of the output voltage to detect sign changes at the filter when the upper and lower limit levels are detected and to skip a predetermined number of pulses from the filter after one of the sign changes to turn off the voltage converter.

2. The apparatus of claim 1, wherein the pulse frequency modulation unit further includes a comparator in the feedback of the output voltage to compare the output voltage to a reference value to detect a sign change at a crossover point when upper and lower limit levels are reached by the output voltage, the sign change to be filtered and detected to generate the control signal.

3. The apparatus of claim 2, wherein the voltage converter includes transistors which switch to generate the output voltage of the second value from a battery having a battery voltage of the first value, and wherein the control signal from the pulse frequency modulation unit controls operations of the transistors.

4. The apparatus of claim 2, wherein the filter includes a high rate filter to filter high rate changes of the output voltage to provide a more rapid response to changes of the output voltage.

5. A direct current to direct current (DC-DC) converter comprising:
 a converter circuit to convert a battery voltage to an output voltage, the converter circuit including a pair of switching transistors that, when enabled, switch alternately to have the battery voltage converted to produce the output voltage; and
 a control circuit to receive a feedback of the output voltage as part of a voltage mode control loop to maintain the output voltage within a specified value, the control circuit including an upper limit level detect circuit and a lower limit level detect circuit to detect upper and lower limit levels for the output voltage;
 the control circuit to disable the converter circuit when the output voltage is at the upper limit level and to enable the converter circuit when the output voltage is at the lower limit level to maintain the output voltage between the upper and lower limit levels by use of the voltage mode control loop, wherein the control circuit includes a comparator in the control loop to compare the output voltage to a reference value to detect a sign change at a crossover point, the sign change indicating when the output voltage has reached the upper or lower limit level and the sign change to be detected by the upper and lower limit level detect circuits, and a filter to receive an output from the comparator to detect the sign change to identify when the upper or lower limit level is reached.

6. The DC-DC converter of claim 5, wherein when the control circuit detects the upper or lower limit levels reached by the output voltage, the control circuit to skip a predetermined number of pulses from the filter after a sign change to ensure a steady state condition is substantially reached prior to initiating the control signal.

7. The DC-DC converter of claim 6, wherein the control circuit further includes a pulse width modulation unit to receive a filtered output from the filter and generate pulse width modulated drive signals to control switching operation of the pair of transistors.

8. An integrated circuit which has an audio system integrated therein, comprising:
  an input interface to receive audio data input;
  a digital signal processor to receive the audio input and generate processed audio data;
  an output amplifier to output the processed audio data external to the integrated circuit; and
  direct current to direct current (DC-DC) converter to power the digital signal processor and output amplifier by converting a battery voltage comprising:
    a converter circuit to convert the battery voltage to an output voltage, the converter circuit including a pair of switching transistors that switch alternately to have the battery voltage converted to produce the output voltage; and
    a control circuit to receive a feedback of the output voltage as part of a voltage mode control loop of the output voltage to maintain the output voltage within a specified value, the control circuit including an upper limit level detect circuit and a lower limit level detect circuit to detect upper and lower limit levels for the output voltage;
    the control circuit to disable the converter circuit when the output voltage is at the upper limit level and to enable the converter circuit when the output voltage is at the lower limit level to maintain the output voltage between the upper and lower limit levels by use of the voltage mode control loop, wherein the control circuit includes a comparator in the control loop to compare the output voltage to a reference value to detect a sign change at a crossover point, the sign change indicating when the output voltage has reached the upper or lower limit levels and the sign change to be detected by the upper and lower limit level detect circuits, and a high rate filter and a low rate filter to filter the output from the comparator to control switching operation of the pair of switching transistors, but only the high rate filter is used to generate a control signal to enable and disable the pair of transistors.

9. The integrated circuit of claim 8, wherein when the control circuit detects the upper or lower limit levels reached by the output voltage, the control circuit to skip a predetermined number of pulses from the filter after a sign change to ensure a steady state condition is substantially reached prior to initiating the control signal.

10. The integrated circuit of claim 9, wherein the control circuit further includes a pulse width modulation unit to receive a filtered output from the filter and generate pulse width modulated drive signals to control switching operation of the pair of transistors.

11. The integrated circuit of claim 9, wherein the comparator includes a tapped voltage divider network at its input to divide the output voltage, in which a first tap point is used to select the lower limit level and a second tap point is used to select the upper limit level, the control circuit to control selection of the tap point in response to sign changes detected by the upper limit level detect circuit and the lower limit level detect circuit.

12. A method to provide voltage mode control loop in a direct current to direct current (DC-DC) converter comprising:
  converting a battery voltage to an output voltage by using a DC-DC converter to have the battery voltage converted to produce the output voltage;
  providing feedback of the output voltage to establish a voltage mode control loop to maintain the output voltage within a specified value between an upper limit level and a lower limit level; and
  detecting the upper limit level and the lower limit level from the control loop to disable the DC-DC converter when the upper limit level is reached and to enable the converter when the lower limit level is reached by comparing the output voltage to a reference value to detect a sign change at a crossover point, the sign change indicating when the output voltage has reached the upper or lower limit levels, and filtering to detect the sign change when one of the limit levels is reached to generate a control signal to enable and disable the pair of transistors.

13. The method of claim 12, further including skipping a predetermined number of pulses from the filtering after a sign change to ensure a steady state condition is substantially reached prior to initiating the control signal.

* * * * *